US 7,252,446 B2

(12) United States Patent  
Katayama et al.

(10) Patent No.: US 7,252,446 B2  
(45) Date of Patent: Aug. 7, 2007

(54) IMAGE FORMING APPARATUS

(75) Inventors: Shigeharu Katayama, Kagamihara (JP); Toshiya Inada, Nagoya (JP)

(73) Assignee: Brother Kogoy Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/844,426

(22) Filed: May 13, 2004

(65) Prior Publication Data

US 2005/0105953 A1 May 19, 2005

(30) Foreign Application Priority Data

| Nov. 13, 2003 | (JP) | ............................ 2003-033907 |
| Mar. 8, 2004 | (JP) | ............................ 2004-006901 |
| Mar. 8, 2004 | (JP) | ............................ 2004-006902 |
| Mar. 31, 2004 | (JP) | ............................ 2004-105504 |

(51) Int. Cl.
*B41J 11/00* (2006.01)
*B41J 15/00* (2006.01)

(52) U.S. Cl. .................. 400/613; 400/578; 399/405; D14/462

(58) Field of Classification Search ............. 400/413; 399/392, 405; D14/462; 358/401
See application file for complete search history.

(56) References Cited

U.S. PATENT DOCUMENTS 5,606,406 A * 2/1997 Ikeyama et al. ............ 399/111

6,612,763 B1 9/2003 Yoshihara

FOREIGN PATENT DOCUMENTS

| JP | A 59-045466 | 3/1984 |
| JP | U 59-173638 | 11/1984 |
| JP | A 04-329557 | 11/1992 |
| JP | A 05-297649 | 11/1993 |
| JP | A 06-106819 | 4/1994 |
| JP | A 06-308793 | 11/1994 |
| JP | A 07-244410 | 9/1995 |
| JP | A 09-185201 | 7/1997 |
| JP | A 10-254327 | 9/1998 |
| JP | A 2001-042586 | 2/2001 |
| JP | A 2001-175123 | 6/2001 |
| JP | A 2002-062711 | 2/2002 |

* cited by examiner

*Primary Examiner*—Daniel J. Colilia
*Assistant Examiner*—Marissa Ferguson-Samreth
(74) *Attorney, Agent, or Firm*—Oliff & Berridge, PLC

(57) ABSTRACT

An image forming apparatus includes a case formed with a front face and a top face, a first accommodating portion formed in the case, an imaging unit that forms an image on a recording medium; the imaging unit being accommodated in the first accommodating portion detachably, and a front cover provided at the front face, the front cover being movable between a first position to open the accommodating portion and a second position to close the accommodating portion, the imaging unit being attached to and removed from the accommodating portion when the front cover is at the first position. The front cover is formed with a round portion.

18 Claims, 9 Drawing Sheets

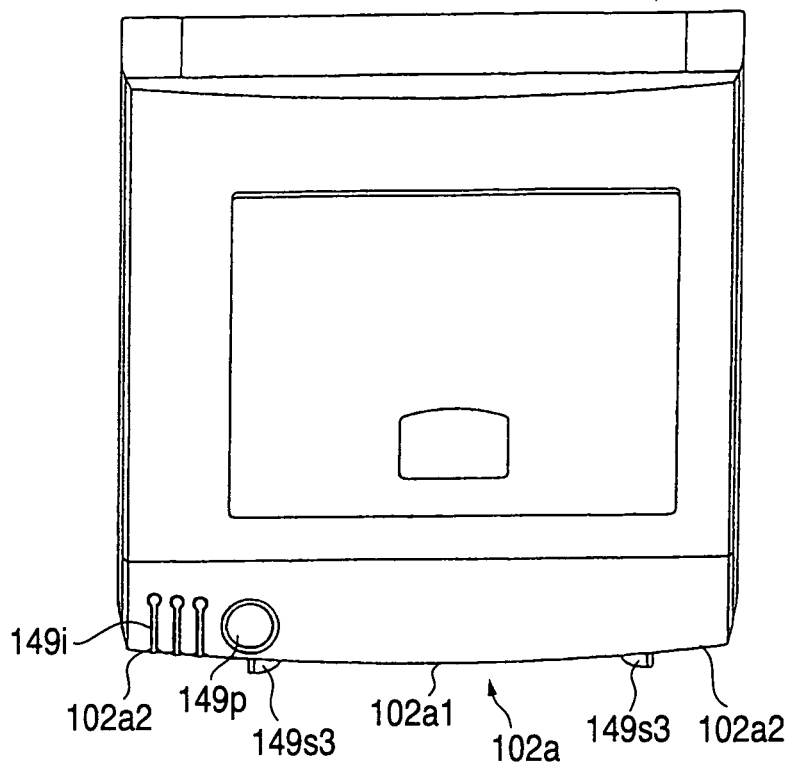
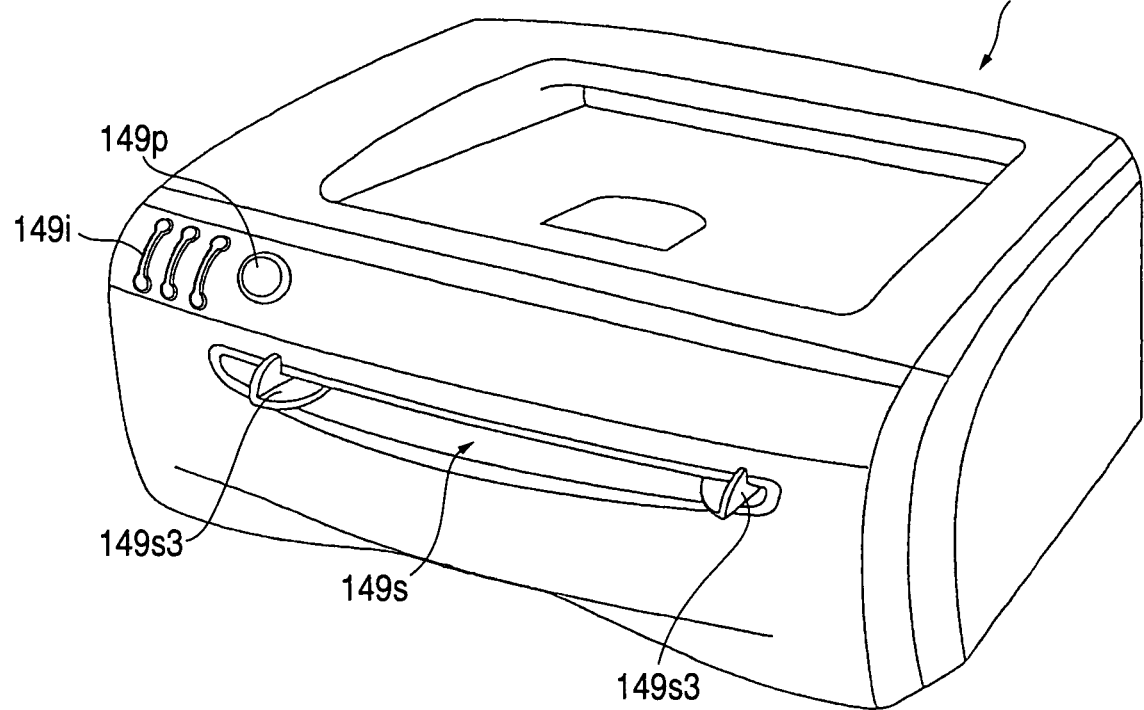

IMAGE FORMING APPARATUS

BACKGROUND OF THE INVENTION

1. Field of the Invention

This invention relates to an image forming apparatus.

2. Description of the Related Art

Conventionally, an image forming apparatus having a cover that is opened and closed for attaching/detaching a process unit is known.

U.S. Pat. No. 6,612,763 discloses an image forming apparatus having a cover on a front face thereof.

SUMMARY OF THE INVENTION

According to one aspect of the invention, there is provided an image forming apparatus, including:

a case formed with a front face and a top face;

a first accommodating portion formed in the case;

an imaging unit that forms an image on a recording medium, the imaging unit being accommodated in the first accommodating portion detachably; and a front cover provided at the front face, the front cover being movable between a first position to open the accommodating portion and a second position to close the accommodating portion, the imaging unit being attached to and removed from the accommodating portion when the front cover is at the first position;

wherein the front cover is formed with a round portion.

BRIEF DESCRIPTION OF THE DRAWINGS

These and other objects and advantages of this invention will become more fully apparent from the following detailed description taken with the accompanying drawings in which:

FIG. 11 is a top plan view of the second embodiment;

FIG. 12 is a perspective view of the second embodiment; and

DETAILED DESCRIPTION OF THE PREFERRED EMBODIMENTS

The preferred embodiments of the present invention will be described with reference to the accompanied drawings.

Figure 1:
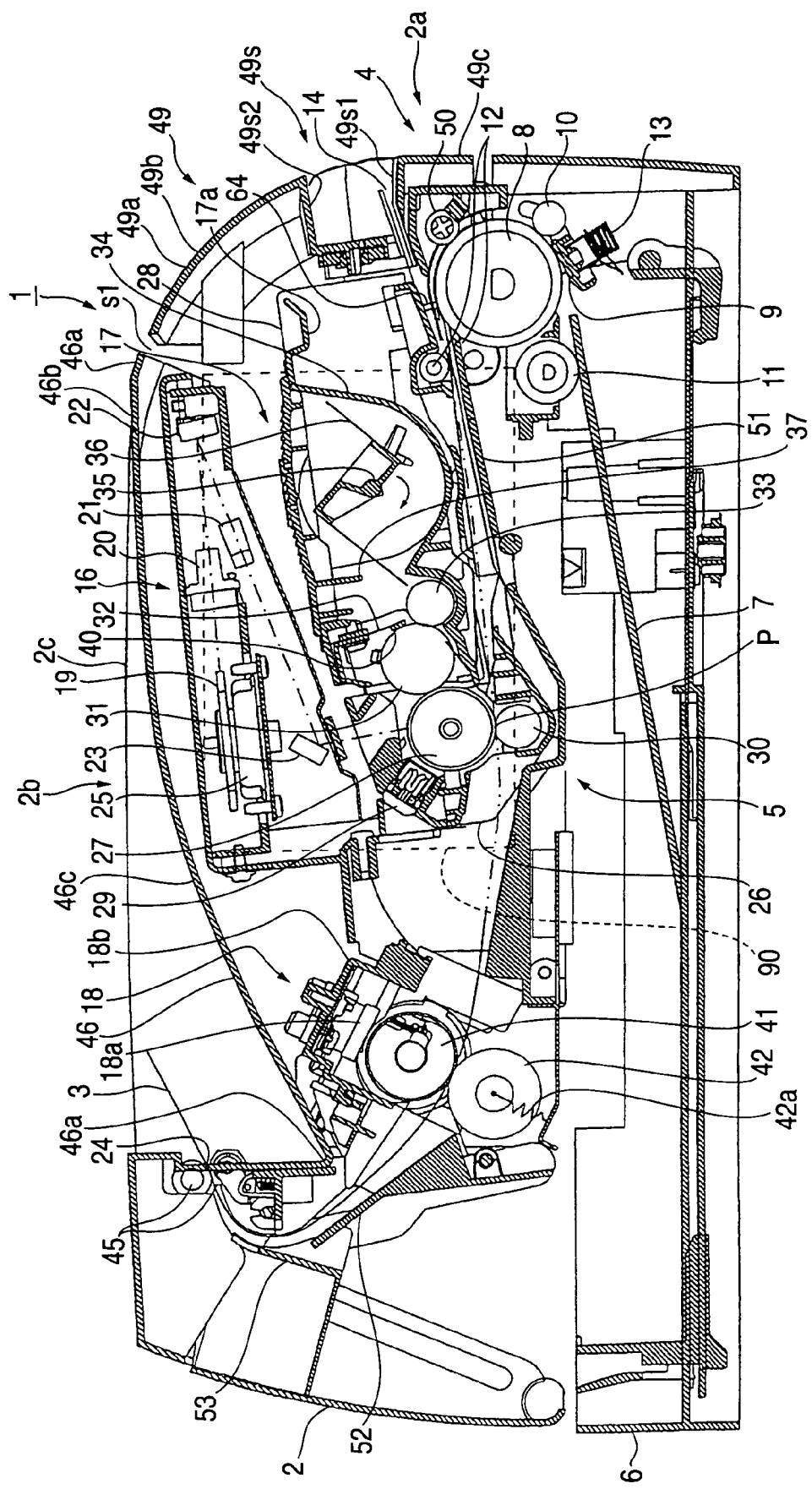
FIG. 1 is a vertical sectional view showing a first embodiment of the invention.

FIG. 1 is a vertical sectional view of a printer 1. FIG. 1 is a view in which the printer 1 is seen from an axial direction of each of various kinds of rollers described later. The right-hand side in this figure is called a front side and the left-hand side is called a rear side. A front cover 49 described later is disposed on a front side face (front face) 2a of the printer 1.

In FIG. 1, the printer 1 has a feeder portion 4 for feeding a paper sheet 3 (recording medium), an image forming portion for forming a predetermined image on the fed sheet 3.

A discharge tray 46 is arranged in an upper portion of the printer 1 and is used to hold the discharged sheet 3 on which the image is formed by the printer 1.

The feeder portion 4 has a paper cassette 6, a sheet pressing plate 7 arranged within the paper cassette 6, a sending-out roller 11 arranged above one end portion of the paper cassette 6, a feed roller 8, a separating pad 9, a pinch roller 10 opposed to the feed roller 8, a paper powder removing roller 50, and a resist roller 12 arranged on the downstream side of the sheet 3 in its conveying direction with respect to the paper powder removing roller 50.

The paper cassette 6 is detachably mounted to the bottom portion within the case 2, and is used to stack and store the sheet 3 into this paper cassette 6. This paper cassette 6 is pulled out on the front side (the right-hand side in FIG. 1) of the printer 1 when the sheet 3 is supplied into the paper cassette 6, etc. At this time, the feeder portion 4 is separated between the feed roller 8 and the separating pad 9, and the pinch roller 10, the separating pad 9 and a spring 13 arranged on a back side of the separating pad 9 are pulled out integrally with the paper cassette 6.

The sheet pressing plate 7 is swingably supported in a farer end portion with respect to the feed roller 8 so that a nearer end portion with respect to the feed roller 8 can be moved in a vertical direction and is biased in an upper direction by an unillustrated spring. Therefore, as the stacking amount of the sheet 3 is increased, the sheet pressing plate 7 is swung in the downward direction against the biasing force of the spring using the farer end portion with respect to the feed roller 8 as a fulcrum.

The sending-out roller 11 is set so as to abut on the sheet 3 stacked by the sheet pressing plate 7 in the uppermost position within the paper cassette 6. The sending-out roller 11 sends the sheet 3 by the feed roller 8 to a conveyable position (position between the feed roller 8 and the separating pad 9).

The separating pad 9 is arranged in the position opposed to the feed roller 8. The separating pad 9 is pressed toward the feed roller 8 by the spring 13 arranged on the back side of the separating pad 9. This separating pad 9 has a function for preventing that plural sheets 3 are supplied into a feed path in an overlapping state. Namely, the sheet 3 sent by the sending-out roller 11 comes in contact with the feed roller 8 and the separating pad 9. At this time, a moderate frictional force is applied between the separating pad 9 and the sheet 3. Accordingly, even when the plural sheets 3 are sent by the sending-out roller 11 to the separating pad, the sheets 3 except for the sheet 3 located in the uppermost position are engaged by the separating pad 9. Therefore, the sheet 3 is supplied from the feed roller 8 one sheet at a time.

The sheet 3 fed by the feed roller 8 is sent to the feed path (shown by the two-dotted chain line of FIG. 1) of the sheet 3. At this time, paper powder is removed from the sheet 3 by the paper powder removing roller 50 and the sheet 3 is then sent to the resist roller 12. This feed path is formed downward from the horizontal direction at the entire interval from the upper end of the feed roller 8 to an image forming position P. In this feed path, a large part from the feed roller 8 to the image forming position P is formed by a guide member 51 formed on a main body side of the printer 1 and a bottom face portion of a process unit 17.

The feed roller 8 sends the sheet 3 to the resist roller 12 by directionally turning the sheet 3 by about 180 degrees.

When curvature for curving the sheet 3 by the feed roller 8 is large and the sheet 3 is a thick material such as a postcard, etc., there is a possibility that the sheet 3 is bent or is not conveyed by resistance in bending the sheet 3 to the resist roller 12.

Therefore, the diameter of the feed roller 8 is set to be large in comparison with rollers such as a photosensitive drum 27, a fixing roller 41, etc. (e.g., the diameter of the feed roller 8 is set to 33 mm when the diameter of the photosensitive drum 27 is set to 24 mm and the diameter of the fixing roller 41 is set to 25 mm). If the diameter of the feed roller 8 is set to be comparatively large in this way and the curvature for curving the sheet 3 is set to be small, the sheet 3 can be preferably conveyed by the feed roller 8 without bending the sheet 3.

The resist roller 12 is constructed by a pair of rollers, and operations for driving and stopping the resist roller 12 are controlled by an unillustrated controller arranged within a board 90 described later on the basis of detection timing using a position sensor 64 arranged in the vicinity of the feed roller 8. A slanting movement of the sheet 3 is corrected by this control. Namely, the controller sets the resist roller 12 to the operating state at the conveying time of the sheet 3 using the feed roller 8, and stops the operation of the resist roller 12 when the position sensor 64 detects the tip of the sheet 3. When the sheet 3 comes in contact with the resist roller 12 and attains a deformed state, the controller again operates the resist roller and sends the sheet 3 to the image forming portion 5.

The position sensor 64 is of a mechanical type. When the position sensor 64 comes in contact with the sheet 3 and is pushed by the sheet 3, the position sensor 64 is constructed so as to be displaced from a predetermined position prior to the contact of the sheet 3.

A manual feed port 14 for directly feeding the sheet 3 from the front side of the printer 1 to the position of the resist roller 12 is formed approximately above the feed roller 8. The sheet 3 can be supplied to the feed path without storing the sheet 3 to the paper cassette 6.

The image forming portion 5 has a scanner unit 16, the process unit 17, a fixing unit 18, etc.

The scanner unit 16 is arranged in the upper portion of the interior of the case 2, and has an unillustrated laser light emitting portion, a polygon mirror 19 rotated and operated by a polygon motor 25, lenses 20, 21, reflecting mirrors 22, 23, etc. As shown by the one-dotted chain line in FIG. 1, a laser beam based on predetermined image data and emitted from the laser light emitting portion passes or is reflected in the order of the polygon mirror 19, the lens 20, the reflecting mirror 22, the lens 21 and the reflecting mirror 23. The laser beam is then irradiated onto the surface of the photosensitive drum 27 in the process unit 17 described later by high speed scanning.

More specifically, the polygon mirror 19 is arranged just above the photosensitive drum 27 and the image forming position P described later in this scanner unit 16. The laser beam reflected on the polygon mirror 19 is advanced toward the reflecting mirror 22 approximately in the horizontal direction. This laser beam is reflected toward the reflecting mirror 23 located just below the polygon mirror 19 by the reflecting mirror 22. Namely, the reflecting mirror 22 reflects the incident laser beam at an acute angle so as to direct the incident laser beam downward by about 15 degrees from the horizontal direction. The scanner unit 16 having each of these portions (polygon mirror 19, lenses 20, 21, reflecting mirrors 22, 23) is set so as to have a size and a shape set to such an extent that no optical path of the laser beam is prevented. Namely, the upper face (upper plate) of this scanner unit 16 is arranged approximately in the horizontal direction (specifically is inclined such that a portion far from the feed roller 8 becomes low). Further, the lower face (lower plate) of the scanner unit 16 is greatly inclined in comparison with the upper face such that a portion far from the feed roller 8 becomes lower. Therefore, the scanner unit 16 is formed in a tapering shape in which the image forming position P side for locating the polygon mirror 19 is thick and the feed roller 8 side is thin.

The process unit 17 functioning as an imaging unit is arranged below the scanner unit 16 and is detachably mounted to the case 2 approximately in the horizontal direction and the forward and backward directions (left and right directions in FIG. 1: attaching and detaching directions). The process unit 17 is constructed by a drum cartridge 26 and a developing cartridge 28. A space is defined between the process unit 17 and the scanner unit 16.

In the process unit 17, the photosensitive drum 27, a scolotron type charger 29 and a transfer roller 30 are arranged in the drum cartridge 26.

A developing roller 31, a layer thickness regulating plate 32, a toner supply roller 33, a toner box 34, etc., are arranged in the developing cartridge 28. This developing cartridge 28 is detachably mounted to the drum cartridge 26.

In constructional elements constituting the process unit 17, the photosensitive drum 27 and the toner box 34 require comparatively large spaces. Therefore, this photosensitive drum 27 and the toner box 34 are set so as not to be arranged just above the feed roller 8 and the resist roller 12 requiring comparatively large spaces in the vicinity of the process unit 17.

The interior of the toner box 34 is filled with toner (developing agent). The toner within the toner box 34 is agitated by rotation in the arrow direction (clockwise direction) of an agitator 36 supported by a rotating shaft 35 arranged at the center of the toner box 34, and is discharged from a toner supply port 37 arranged in the toner box 34.

The toner supply roller 33 is arranged in the side position of the toner supply port 37 so as to be rotated in the counterclockwise direction. The developing roller 31 is rotatably arranged in the counterclockwise direction so as to be opposed to this toner supply roller 33. The toner supply roller 33 and the developing roller 31 abut on each other in a state in which each of these rollers is compressed to a certain extent.

In the toner supply roller 33, a roller shaft manufactured by a metal is covered with a roller constructed by an electrically conductive foaming material. In the developing roller 31, a roller shaft manufactured by a metal is covered with a roller constructed by an electrically conductive rubber material having no magnetic characteristics. More concretely, in a roller portion of the developing roller 31, the surface of a roller main body constructed by electrically conductive urethane rubber or silicon rubber including carbon fine particles, etc., is covered with a coat layer of urethane rubber or silicon rubber including fluorine. A developing bias is applied to the developing roller 31.

The layer thickness regulating blade 32 is arranged in the vicinity of the developing roller 31. This layer thickness regulating blade 32 has a pressing portion 40 of a semicircular shape in section constructed by silicon rubber of an insulating property in the tip portion of a blade main body constructed by a metallic leaf spring material. The layer thickness regulating blade 32 is constructed such that the layer thickness regulating blade 32 is supported by the developing cartridge 28 near the developing roller 31 and the pressing portion 40 comes in press contact with the developing roller 31 thereon by the elastic force of the blade main body.

The toner discharged from the toner supply port 37 is supplied to the developing roller 31 by rotating the toner supply roller 33. At this time, the toner is positively frictionally charged between the toner supply roller 33 and the developing roller 31. The toner supplied onto the developing roller 31 is advanced between the pressing portion 40 of the layer thickness regulating blade 32 and the developing roller 31 as the developing roller 31 is rotated. Here, the toner is further sufficiently frictionally charged and is carried onto the developing roller 31 as a thin layer having a constant thickness.

In the side position of the developing roller 31, the photosensitive drum 27 is rotatably arranged in the clockwise direction in the state opposed to this developing roller 31. In this photosensitive drum 27, the drum main body is connected to the ground and its surface portion is formed by a photosensitive layer of a positive charging property constructed by polycarbonate, etc. This photosensitive drum 27 is constructed so as to be rotated and operated by power from an unillustrated main motor.

The scolotron type charger 29 is spaced from the photosensitive drum 27 at a predetermined interval so as not to come in contact with the photosensitive drum 27. This scolotron type charger 29 is arranged above by about 30 degrees from the horizontal direction in the radial direction of the photosensitive drum 27. Further, this scolotron type charger 29 is a charger of the scolotron type for positive charging for generating corona discharge from a wire for charging of tungsten, etc. The scolotron type charger 29 is constructed such that the surface of the photosensitive drum 27 is uniformly charged to the positive electrode property.

The surface of the photosensitive drum 27 is first charged uniformly positively by the scolotron type charger 29 as this photosensitive drum 27 is rotated. Thereafter, the surface of the photosensitive drum 27 is exposed by the high speed scanning of the laser beam from the scanner unit 16, and an electrostatic latent image based on predetermined image data is formed.

Next, when the toner carried onto the developing roller 31 and positively charged is opposed to the photosensitive drum 27 and comes in contact with the photosensitive drum 27 by the rotation of the developing roller 31, the toner is supplied to the electrostatic latent image formed on the surface of the photosensitive drum 27. Namely, the toner is supplied to an exposure portion exposed by the laser beam and lowered in electric potential on the surface of the photosensitive drum 27 uniformly positively charged. The toner is then formed as a visual image by selectively carrying the toner so that an inverted developed image is achieved.

The transfer roller 30 is arranged below the photosensitive drum 27 so as to be opposed to this photosensitive drum 27, and is rotatably supported by the drum cartridge 26 in the counterclockwise direction. In this transfer roller 30, a roller shaft manufactured by a metal is covered with a roller constructed by a rubber material of an ionic electrically conductive property. The transfer roller 30 is constructed such that a transfer bias (transfer forward bias) is applied to the transfer roller 30 at the transfer time. Therefore, the visible image carried onto the surface of the photosensitive drum 27 is transferred to the sheet 3 while the sheet 3 passes between the photosensitive drum 27 and the transfer roller 30 (image forming position P).

The fixing unit 18 is arranged on the downstream side (rear side) in the conveying direction of the sheet from the process unit 17. The fixing unit 18 has the fixing roller 41 having a gear therein, the pressing roller 42 for pressing the fixing roller 41, and a thermostat 18a. The fixing roller 41 and the thermostat 18a are covered with a cover 18b.

The fixing roller 41 is manufactured by a metal and has a halogen lamp for heating.

The pressing roller 42 has a spring 42a for rotatably pressing (biasing) this pressing roller 42 from below in the direction of the central axis of the fixing roller 41. Further, this pressing roller 42 is constructed so as to come in close contact with the fixing roller 41 or the sheet 3 and be rotated in synchronization with the fixing roller 41.

For example, the thermostat 18a is constructed by a bimetal and turns on and off the power source of a heater for heating the fixing roller 41 in accordance with the heat generated from the fixing roller 41 so as not to heat the heating roller 42 to an extraordinary temperature.

This thermostat 18a is arranged on an extension line (virtual line) connecting the rotation centers of the pressing roller 42 and the fixing roller 41 above the fixing roller 41. Therefore, the position of a concave portion 46a of the discharge tray 46 can be lowly set in comparison with cases in which the thermostat 18a is arranged just above the fixing roller 41 and on the rear side (left-hand side in FIG. 1: downstream side in the conveying direction of the sheet 3) from just above the fixing roller 41.

The cover 18b has a shape covering the side and the upper portion of the fixing roller 41 such that the heat generated from the fixing roller 41 is discharged from the fixing unit 18 to the exterior of the fixing unit 18 and has no bad influence on other devices (e.g., the scanner unit 16, etc.) within the case 2. Here, with respect to the pressing roller 42, this cover 18b rotatably supports only the unillustrated central shaft of the pressing roller 42 so as to be moved in the biasing direction of the spring 42a. The lower half portion of this pressing roller 42 is set to a state exposed from the cover 18b. Therefore, the printer 1 is set to be low in height by the thickness amount of this cover 18b in comparison with a case in which the cover 18b covers the lower portion of the pressing roller 42.

In such a fixing unit 18, the fixing roller 41 fixes the toner by heating and pressurizing the toner transferred onto the sheet 3 in the process unit 17 while the sheet 3 passes between the fixing roller 41 and the pressing roller 42. Further, the fixing roller 41 conveys the sheet 3 after the image fixation through a discharge path formed by guide members 52, 53 to a discharge roller 45. The discharge roller 45 discharges the sent sheet 3 onto the discharge tray 46. A pair of discharge rollers 45 function as discharge ports 24 for discharging the sheet 3 to the exterior of the printer 1.

Here, when the sheet 3 is suddenly curved in the state heated by the fixing roller 41, there is a possibility that no sheet 3 is returned from the curving state to the original un-curving state. Therefore, the guide members 52, 53 coming in contact with the sheet 3 after the passage of the fixing roller 41 are set such that the sheet 3 is gently curved after the passage of the fixing roller 41 in an overheated state and is suddenly curved as the sheet 3 approaches the discharge roller 45.

In accordance with such a construction, the position of the discharge port 24 can be arranged downward in comparison with a case in which the entire discharge path of the sheet 3 is gently curved. Accordingly, the height of the printer 1 is easily set to be low while permanent curving of the sheet 3 is prevented.

The discharge tray 46 has a gradually dropping shape from the front side of the printer 1 to the rear side (left-hand side in FIG. 1). The most dropping portion (concave portion 46a) of this discharge tray 46 is set to be located in a position lower than that of the upper end of the fixing unit 18. Therefore, the discharge roller 45 can be arranged in a lower position without reducing the number of sheets 3 stackable in the discharge tray 46. Therefore, the height of the printer 1 in an arranging portion of the scanner unit 16 and the height of the printer 1 in an arranging position of the discharge roller 45 can approach each other so that a design property (appearance) is improved.

In other words, a top cover 2c having the discharge tray 46 is arranged on a top face 2b of the printer 1. The discharge tray 46 has an inclining portion 46c inclined upward toward the front side, a flat portion 46c connected to a front side end portion of the inclining portion 46c, and a round portion 46a connected to a front side end portion of the flat portion 46c.

As shown by the broken line in FIG. 1, the board 90 mounting the controller for controlling the operations of the above various kinds of rollers, the polygon mirror 19, etc., in this printer 1 is arranged on both side faces of the feed path for conveying the sheet 3 so that the board 90 sandwiches the process unit 17 from the side faces.

Figure 2:
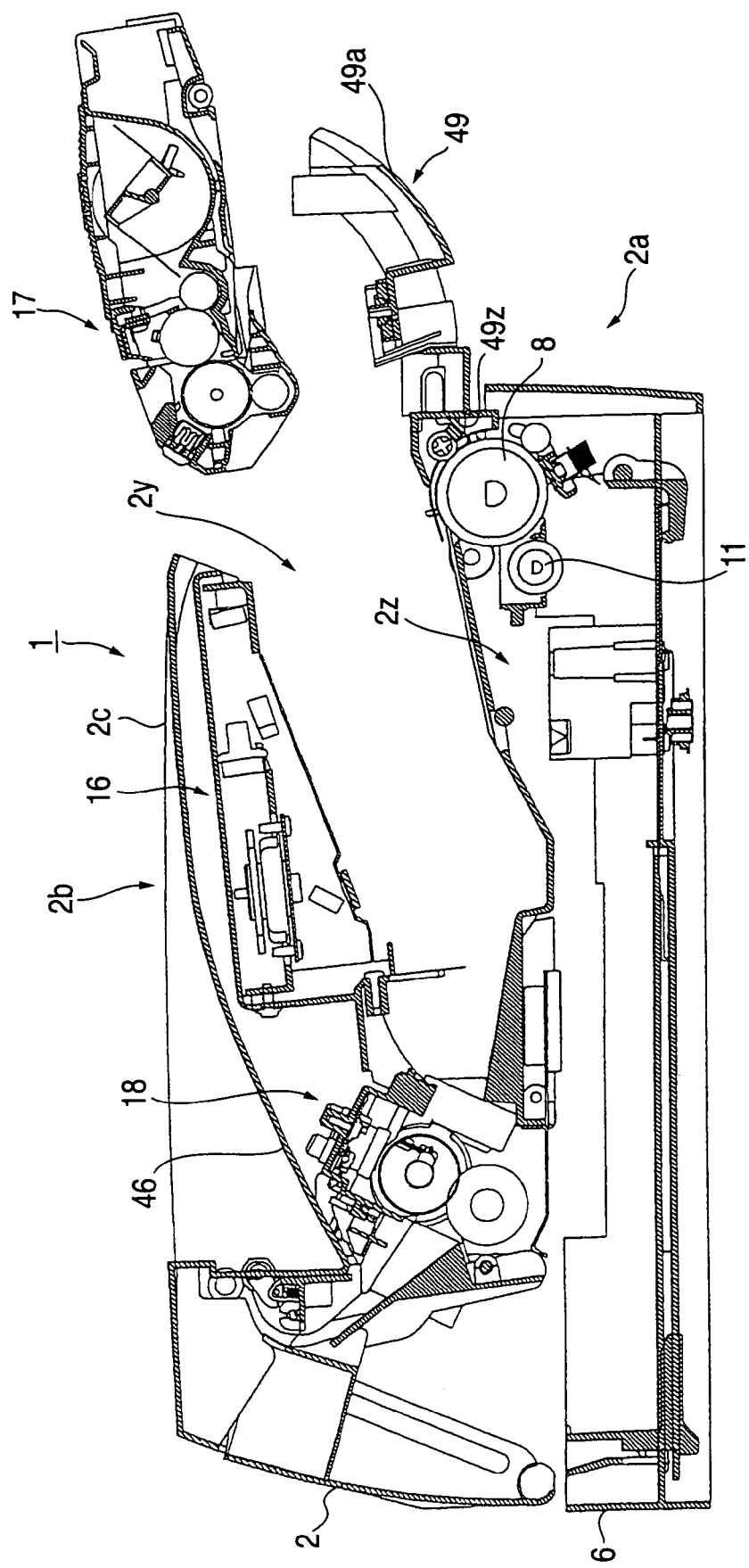
FIG. 2 shows a condition that a process unit is detached.
Figure 3:
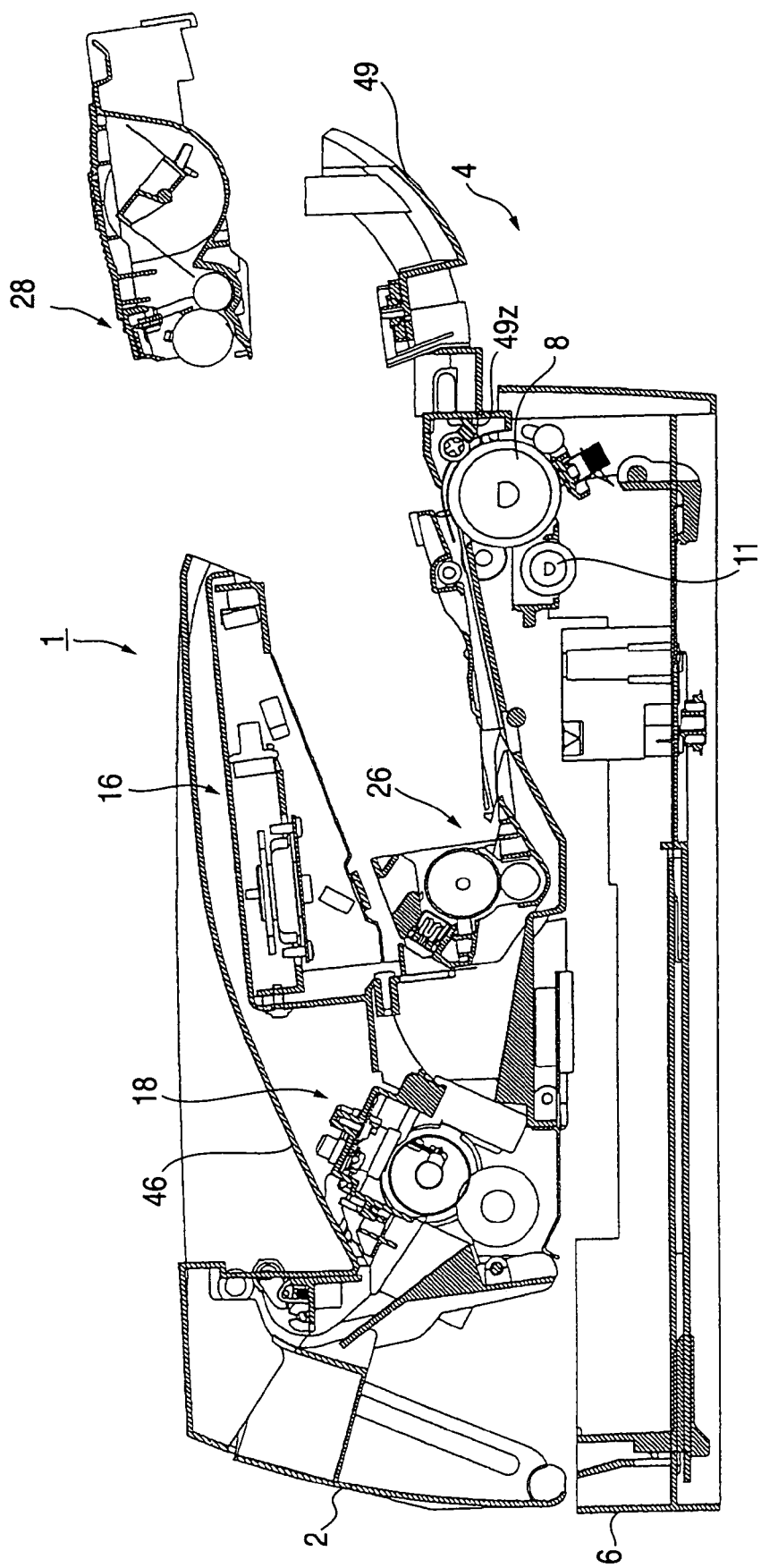
FIG. 3 shows a condition that only a developer cartridge of the process unit is detached.

Next, the detachment of the process unit 17 performed by a user will be described with reference to FIGS. 2 and 3. FIG. 2 is an explanatory view showing a state in which the process unit 17 is detached. FIG. 3 is an explanatory view showing a state in which only the developing cartridge 28 of the process unit 17 is detached.

When detaching the process unit 17 in the state of FIG. 1, the user first opens the front cover 49 of the printer 1 on the front side of the printer and sets the front cover 49 to the state shown in FIG. 2. At this time, the front cover 49 is rotated with a support shaft 49z as a fulcrum. The support shaft 49z is located above the paper cassette 6.

The process unit 17 is then pulled out from the state of FIG. 1 on the front side (detaching direction) of the printer 1 approximately in the horizontal direction, and passes above the feed roller 8 and is detached. At this time, since the space is formed between the process unit 17 and the scanner unit 16 as mentioned above, the user raises a handle 17a located on the front side (side near the feed roller 8) of the process unit 17 in the direction of the scanner unit 16 and can pull out the process unit 17 as it is. In accordance with this construction, no deep side (image forming position P side) of the process unit 17 is caught by the main body of the printer 1 and the process unit 17 can be smoothly pulled out.

Further, when detaching the process unit 17, only the developing cartridge 28 is detached in a state in which the drum cartridge 26 constituting the process unit 17 is left within the printer 1 as shown in FIG. 3.

The printer 1 described in detail as mentioned above has the paper cassette 6 for storing the sheet 3 in the stacking state below the printer 1, and the feed path located above the paper cassette 6 and conveying the sheet 3 stored in the paper cassette 6 to the exterior of the printer 1 via the image forming position P. The printer 1 also has the feed roller 8 located above the vicinity of the end portion of the paper cassette 6 and supplying the sheet 3 stacked on the uppermost portion of the paper cassette 6 to the feed path. The printer 1 also has the toner box 34 arranged in the position proximate to the feed roller 8 above the paper cassette 6, and storing the photosensitive drum 27 and the toner. The printer 1 also has the process unit 17 passing the upper portion of the feed roller 8 and able to be taken out of the printer 1 approximately in the horizontal attaching and detaching directions. The printer 1 further has the scanner unit 16 arranged above the process unit 17 and having at least the polygon mirror 19.

The scanner unit 16 is formed in the tapering shape having a thin thickness on the feed roller 8 side in the detaching direction so as to take out the process unit 17. One portion of the feed path is formed in an area defined by the process unit 17 and the paper cassette 6. The image forming position P located on the feed path is located in the position lower than that of the upper end of the feed roller 8.

Accordingly, the process unit 17 can be easily taken out. Further, since the scanner unit 16 is formed in the tapering shape reduced in thickness in the area just above the feed roller 8, the height of the printer 1 in the position of the feed roller 8 can be reduced in comparison with a case in which no scanner unit 16 is formed in the tapering shape.

Further, since the position of the process unit 17, etc., can be lowered by the amount of the image forming position P lowered from the upper end of the feed roller 8, the height of the printer 1 in the image forming position P can be reduced.

Further, the process unit 17 has the photosensitive drum 27 and the transfer roller 30. Accordingly, when the process unit 17 is exchanged, the photosensitive drum 27 and the transfer roller 30 can be also exchanged.

Further, since the scanner unit 16 has the upper and lower plates constituting an external wall and the lower plate is slantingly arranged from the horizontal direction in comparison with the upper plate, the height in the vicinity of the feed roller 8 can be reliably reduced.

Further, the scanner unit 16 has the polygon motor 25 for rotating the polygon mirror 19, and also has the two reflecting mirrors 22, 23 for sequentially reflecting the laser beam scanned by the polygon mirror 19 and guiding the laser beam to the photosensitive drum 27. The reflecting mirror 22 for first reflecting the laser beam is located on the feed roller 8 side in the attaching and detaching directions of the process unit 17 within the scanner unit 16. The scanner unit 16 is further constructed such that the polygon mirror 19, the polygon motor 25 and the reflecting mirror 23 for subsequently reflecting the laser beam are located on the side opposed to the feed roller 8 in the attaching and detaching directions of the process unit 17 in the scanner unit 16.

Accordingly, the height in the vicinity of the feed roller 8 can be reduced since the scanner unit 16 can be reliably formed in the tapering shape having a thin thickness on the feed roller 8 side.

Further, since the feed path is inclined downward at the entire interval from the upper end of the feed roller 8 to the image forming position P, it is possible to effectively use the upper area in the portion from the feed roller 8 to the image forming position P within an area in the vicinity of the feed path so that the printer 1 can be made compact.

Further, the photosensitive drum 27 and the toner box 34 constituting the process unit 17 are arranged in the area just above the feed roller 8 and the area of the image forming position P side in the attaching and detaching directions from the resist roller 12. The photosensitive drum 27 and the toner box 34 are not stacked with the feed roller 8 or the resist roller 12. Accordingly, the sizes of the photosensitive drum 27 and the toner box 34 are secured and the printer 1 can be made compact without reducing the sizes of the photosensitive drum 27 and the toner box 34.

In addition, the scanner unit 16 is arranged in the area of the printer 1 side in the attaching and detaching directions from the area just above the feed roller 8, and is arranged without being stacked with the feed roller 8. Accordingly, the height of the printer 1 in the arranging position of the feed roller 8 can be reduced.

Further, the fixing roller 41 for fixing the toner transferred to the sheet 3 is arranged in the feed path. The discharge roller 45 is arranged in the vicinity of the discharge port 24 in the feed path and is the only roller arranged on the feed path between the fixing roller 41 and the discharge port 24 for discharging the sheet 3 to the exterior of the printer 1. The guide members 52, 53 for guiding the sheet 3 are also arranged in the feed path at the interval from the fixing roller 41 to the discharge roller 45. The interval from the fixing roller 41 to the discharge roller 45 is set so as to be shorter than the length of the sheet 3 of a recordable smallest size in its conveying direction.

Accordingly, since this printer 1 has no other rollers from the fixing roller 41 to the discharge roller 45, a space for arranging the other rollers can be saved so that the printer 1 can be made compact.

Further, the guide members 52, 53 constituting the feed path are set such that the curvature of the vicinity of the discharge roller 45 in the guide members 52, 53 is greater than the curvature of the vicinity of the fixing roller 41. Accordingly, while the curl of the sheet 3 is effectively restrained, the arranging position of the discharge roller 45 can be set to a position lowered as much as possible.

Further, the feed path has a shape for inverting the sheet 3 on the downstream side of the sheet 3 in its conveying direction from the image forming position P and in the vicinity of the feed roller 8. The feed path is formed in an S-shape when the feed path is seen from the axial direction of the feed roller 8.

Accordingly, in this printer 1, since the feed path that is long in comparison with the size of the printer 1 can be formed, constructional elements to be arranged in the vicinity of the feed path can be efficiently arranged.

Further, the discharge tray 46 has a concave portion set such that the bottom face on the side close to the discharge port 24 is located in a position lower than that of the uppermost face in the fixing unit 18. Accordingly, the area of the vicinity of the fixing roller 41 can be effectively used and the position of the discharge port 24 can be lowered. Therefore, the height of the printer 1 in the vicinity of the discharge port 24 can be reduced.

Further, the pressing roller 42 is arranged in the conveying direction of the sheet 3 from the fixing roller 41 (i.e., a position shifted on the side opposed to the direction of the feed roller 8 from the position just below the fixing roller 41). The thermostat 18a is constructed so as to be located on the plane perpendicular to a virtual straight line connecting the rotation centers of the fixing roller 41 and the pressing roller 42.

Accordingly, in this a printer 1, the height of the printer 1 can be further reduced since the position of the concave portion 46a in the discharge tray 46 can be set to a lower position.

Further, since the fixing unit 18 can be arranged along the curve formed by the discharge tray 46, a useless space within the printer 1 can be reduced.

Further, the cover 18b is constructed so as to cover the thermostat 18a and the fixing roller 41 constituting the fixing unit 18 in a state in which the pressing roller 42 is exposed.

Accordingly, in this printer 1, since a construction for arranging no cover 16b below the fixing unit 18 can be adopted, the height of the printer 1 can be reduced by the thickness amount of this cover 18b.

Further, the board 90 mounting an electronic circuit for electrically controlling the operation of each portion constituting the printer 1 is arranged (arranged on a side and extending from the front to rear side of the feed path seen from the axial direction of the feed roller B) on the vertical face parallel to the detaching direction of the process unit 17 on one side of the printer 1. Accordingly, it is possible to set the thickness of the board 90 so as not to be reflected in the height of the printer 1, and the height of the printer 1 can be reduced in comparison with a case in which the board 90 is arranged so as to be laid down.

Further, since the scolotron type charger 29 for charging the photosensitive drum 27 is arranged so as to charge the photosensitive drum 27 in a position within about 45 degrees from the horizon in the radial direction of the photosensitive drum 27. Accordingly, it is possible to set the scolotron type charger 29 such that no scolotron type charger 29 is easily projected upward from the upper end of the photosensitive drum 27. Hence, it is possible to set the height of the scolotron type charger 29 so as not to be easily reflected in the height of the printer 1.

In addition, this printer 1 has the sending-out roller 11 and the separating pad 9. The sending-out roller 11 conveys the sheet 3 stacked to the feed tray 6 by the feed roller 8 until a conveyable position of the sheet 3. The separating pad 9 is arranged in the vicinity of the position of the sheet 3 able to be conveyed by the feed roller 8. When plural sheets 3 are supplied by the sending-out roller 11, the separating pad 9 is engaged with the supplied sheets 3 and passes only the sheet 3 located in the uppermost position of the paper cassette 6.

Accordingly, in this printer 1, since the load applied to the separating pad 9 can be reduced by arranging the sending-out roller 11, it is possible to prevent wear of the separating pad 9 and the sheet 3.

The present invention is not limited to the above embodiment, but various modes can be adopted as long as the modes belong to the technical scope of the present invention.

For example, in the printer 1 of this embodiment, an image is formed on the sheet 3, but it is not necessary to particularly form the image on the sheet 3. For example, the image may be also formed on an OHP sheet, cloth, etc.

Further, in the present embodiment, the thermostat 18a is used so as not to abnormally heat the fixing roller 41, but the present invention is not limited to this construction. For example, the present invention may be also constructed so as to arrange a temperature sensor.

The other features of this embodiment will be described. As shown in FIG. 2, a first accommodating portion 2y for accommodating a process unit 17 and a second accommodating portion 2z for accommodating a paper cassette 6 are arranged within a case 2. A front cover 49 has a round portion 49a. The round portion 49a is continued to a top face 2b and a front face 2a of the printer 1 when the front cover 49 is closed. Namely, when the front cover 49 is closed, the round portion 49a smoothly connects to the top face 2b and the front face 2a without forming an edge or a corner.

Since the front cover 49 is extended to the top face 2b, light enters to the interior of the printer 1 and the interior of the printer 1 is easily seen and the process unit is clearly seen when the front cover 49 is opened (the front cover 49 is located in a first position). Accordingly, the user can easily and reliably attach and detach the process unit, and can easily remove jammed sheets.

Figure 5:
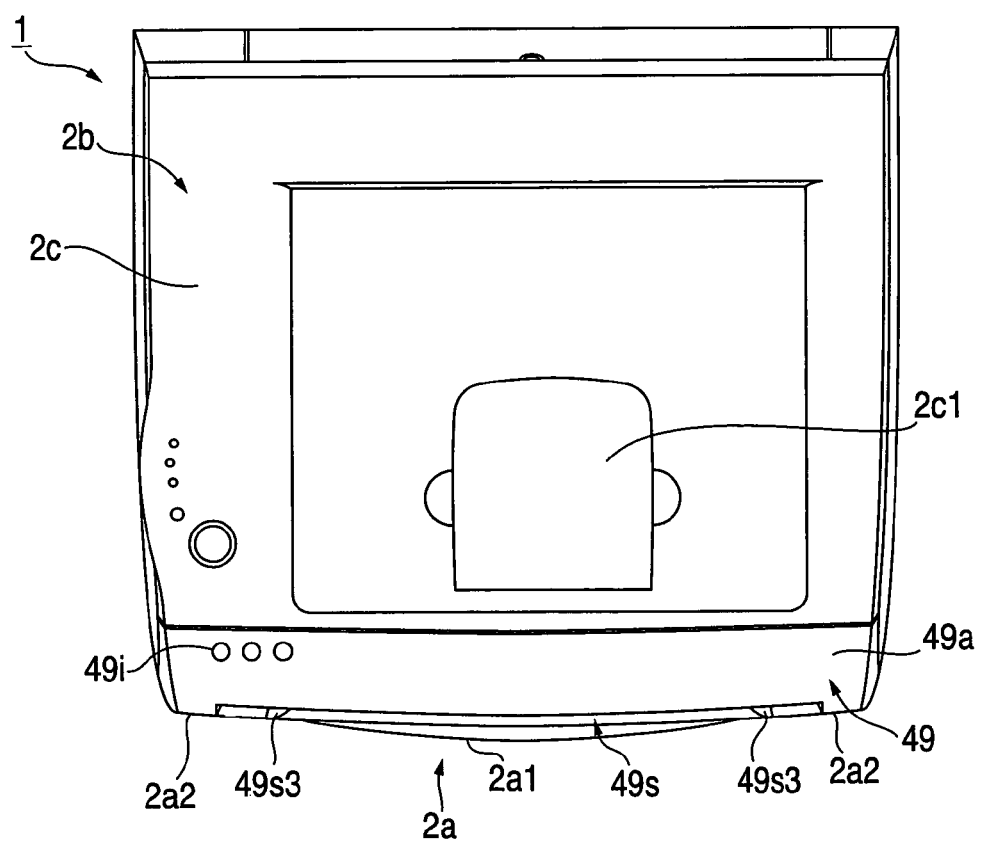
FIG. 5 is a top plan view of the first embodiment.

In FIG. 5, reference numeral 49i designates an indicator arranged in the round portion 49a.

Figure 4:
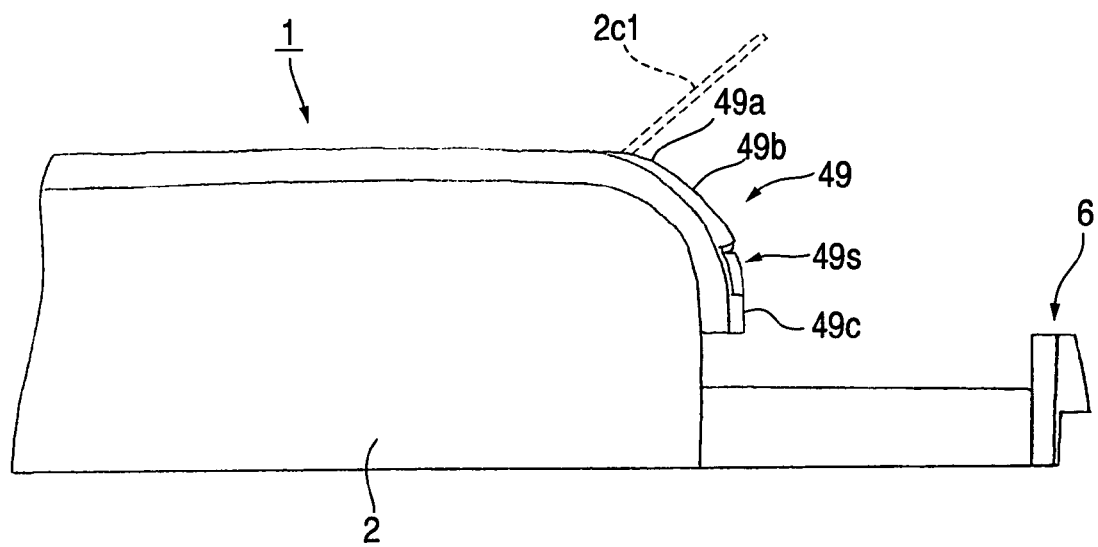
FIG. 4 is a left side view showing a condition that a paper cassette is drawn out.

When the sheet jam is caused, there are many cases in which the user searches the jammed sheet by opening the paper cassette 6 as shown in FIG. 4 and also searches the jammed paper by opening the front cover 49 while opening the paper cassette 6. At this time, since the front cover 49 has the round portion 49*a* as shown in FIG. 2, the front cover 49 and members such as an indicator, a switch, etc., which are slightly projected from the round portion 49*a*, do not interfere with the paper cassette 6.

As shown in FIG. 1, the front cover 49 has a slit opening 49*s* functioning as a manual feed port between an upper portion 49*b* and a lower portion 49*c*. A lower face 49*s*1 defining the slit opening 49*s* is approximately extended in the horizontal direction, while an upper face 49*s*2 is upward inclined. The slit opening 49*s* is slantingly upward opened. Accordingly, it is easy for the user to feed the sheet to this slit opening 49*s*.

The round portion 49*a* of the front cover 49 is extended over the entire upper portion 49*b*. A virtual extension line of this round portion 49*a* is substantially connected to the front face of the lower portion 49*c*. The round portion 49*a* is terminated at the upper end of the lower portion 49*c*. Since the round portion 49*a* has such a shape, the lower face 49*s*1 defining the slit opening 49*s* is necessarily projected to the front side from the upper face 49*s*2. Namely, the lower portion 49*c* is projected to the front side from the upper portion 49*b*. Accordingly, it is easy for the user to feed the sheet to the slit opening 49*s*.

The projecting mode of the lower portion 49*c* to the front side from the upper portion 49*b* is not limited to the above mode. For example, the lower portion 49*c* may be also projected to the front side from the upper portion 49*b* by providing a projection on the lower portion 49*c*.

As shown in FIG. 5, in a top plan view, the front face 2*a* of the printer 1 has a center portion 2*a*1 located in the central portion of the slit opening 49*s* in its longitudinal direction and also has side portions 2*a*2 located at both ends of the slit opening 49*s*. The center portion 2*a*1 is projected to the front side with respect to the side portions 2*a*2. One side portion 2*a*2, the center portion 2*a*1 and the other side portion 2*a*2 are connected to each other by a smooth curve. A manual feed guide 49*s*3 for guiding a side edge of the manually fed sheet is arranged on one side and the other side of the slit opening 49*s* in its longitudinal direction. The feed roller 8 is disposed at the central portion of the printer 1 in its width direction. In this printer 1, the sheet is conveyed in a state in which the central portion of the sheet in its width direction is located in the central portion of the printer 1 in its width direction (left and right directions in FIG. 5).

Since the center portion 2*a*1 of the front face 2*a* is projected from the side portion 2*a*2 to the front side, it is easy for the user to insert the sheet to the slit opening 49*s*. Since the feed roller 8 is adjacently located on the rear side of the center portion 2*a*1, the inserted sheet is surely picked up by the feed roller 8. In this embodiment, the center portion 2*a*1 and the side portions 2*a*2 are provided on the front cover 49.

FIG. 5 also shows a state in which a sheet holder 2*c*1 arranged in a top cover 2*c* is accommodated in the top cover 2*c*. FIG. 4 shows a rising situation of the sheet holder 2*c*1 by a broken line.

As shown in FIG. 1, when the front cover 49 is closed (when the front cover 49 is located in a second position), the virtual extension line of the round portion 49*a* of the front cover 49 is substantially connected to the round portion 46*a* of the top cover 2*c*. In other words, a slit s1 for separating the front cover 49 and the top cover 2*c* is formed between the round portions 49*a* and 46*a*.

As shown in FIG. 1, the printed sheet 3 is discharged from the rear side of the printer 1 to the front side. The sheet 3 first comes in contact with the inclined portion 46*c* of the discharge tray 46, and next comes in contact with the flat portion 46*b*. Since the sheet 3 is guided by the flat portion 46*b* in the horizontal direction, no tip of the sheet 3 is engaged with the slit s1 that separates the front cover 49 and the top cover 2*c* without raising the sheet holder 2*c*1 as shown in FIG. 4. Further, the flat portion 46*b* supports the sheet 3 so as to hold the sheet 3 in the horizontal state so as to prevent that the sheet 3 covers the front cover 49 thereon in a curving state. Accordingly, smooth opening and closing of the front cover 49 are not prevented by the discharged sheet 3.

Figure 6:
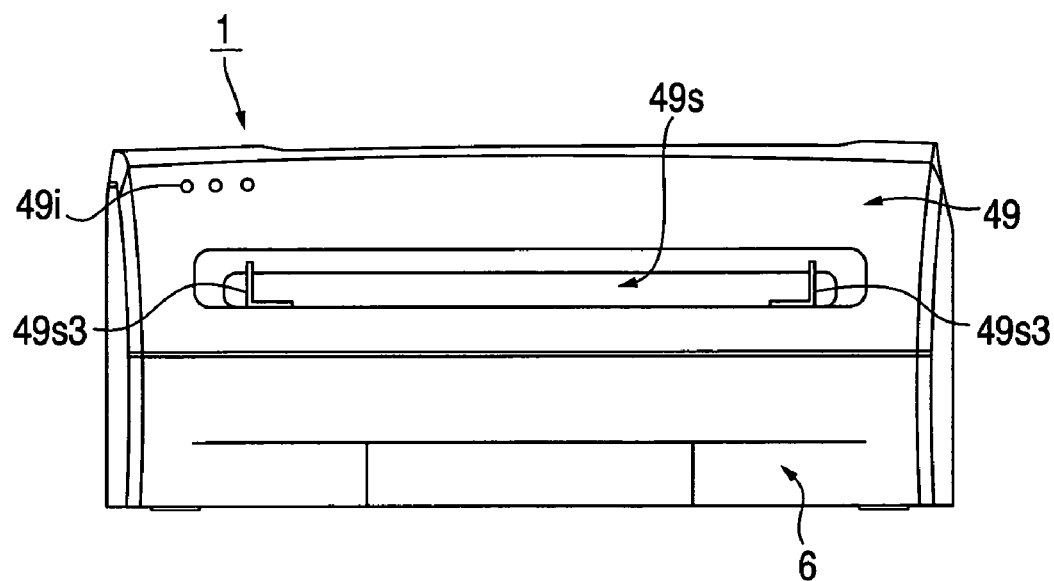
FIG. 6 is a front plan view of the first embodiment.

As shown in FIG. 6, the manual feed guide 49*s*3 has substantially an L-shape seen from the front face of the printer 1.

Figure 7:
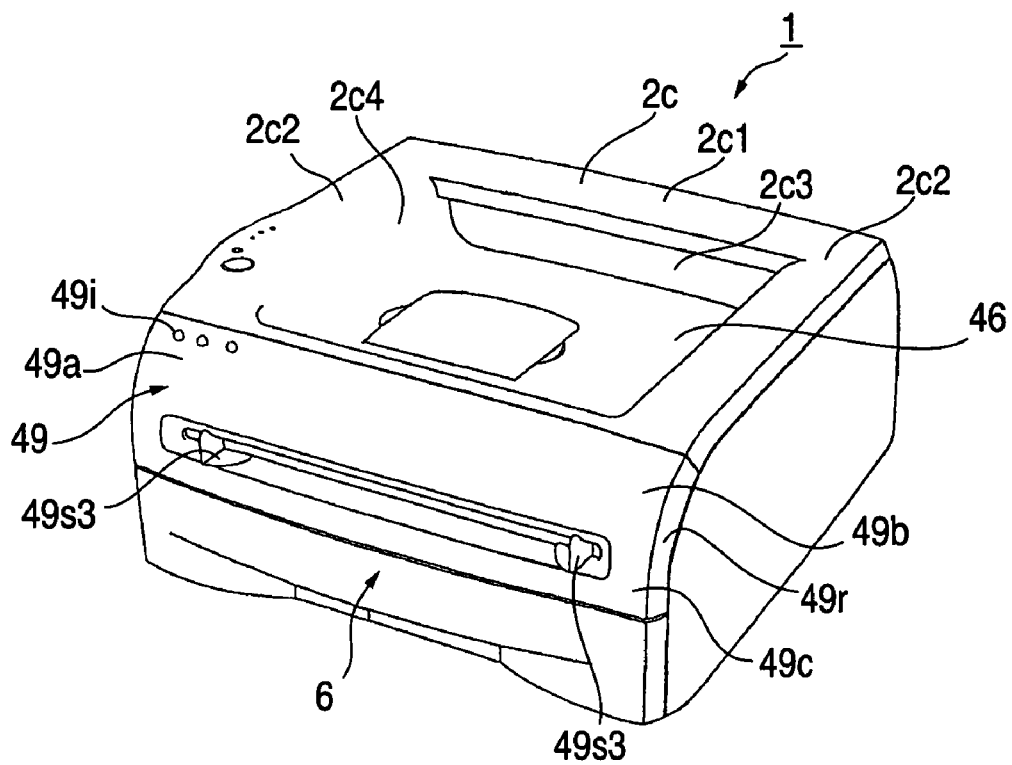
FIG. 7 is a perspective view of the first embodiment.

As shown in FIG. 7, the front cover 49 has side ribs 49*r* on its both sides. The side rib 49*r* is extended over the entire areas of the upper portion 49*b* and the lower portion 49*c* of the front cover 49, and constitutes a part of the side face of the printer 1. The side rib 49*r* is projected from the front cover 49 to the rear side while the side rib 49*r* is curved in the same manner as the round portion 49*a*.

The side rib 49*r* enhances the strength of the front cover 49.

As shown in FIG. 7, the top cover 2*c* has a center portion 2*c*1 extended in the width direction (left and right directions in FIG. 7) of the printer 1 on the rear side, and side portions 2*c*2 located on both sides of the center portion 2*c*1 and extended from the rear side to the front side. A step is formed between the center and side portions 2*c*1, 2*c*2 and the discharge tray 46. Dust is easily accumulated at the corner formed by the discharge tray 46 and a vertical wall 2*c*3 extended from the discharge tray 46 to the center portion 2*c*1.

In this embodiment, the discharge tray 46 and the side portion 2*c*2 are connected by a sidewall 2*c*4 formed by combining a curved surface and a plane.

Figure 8:
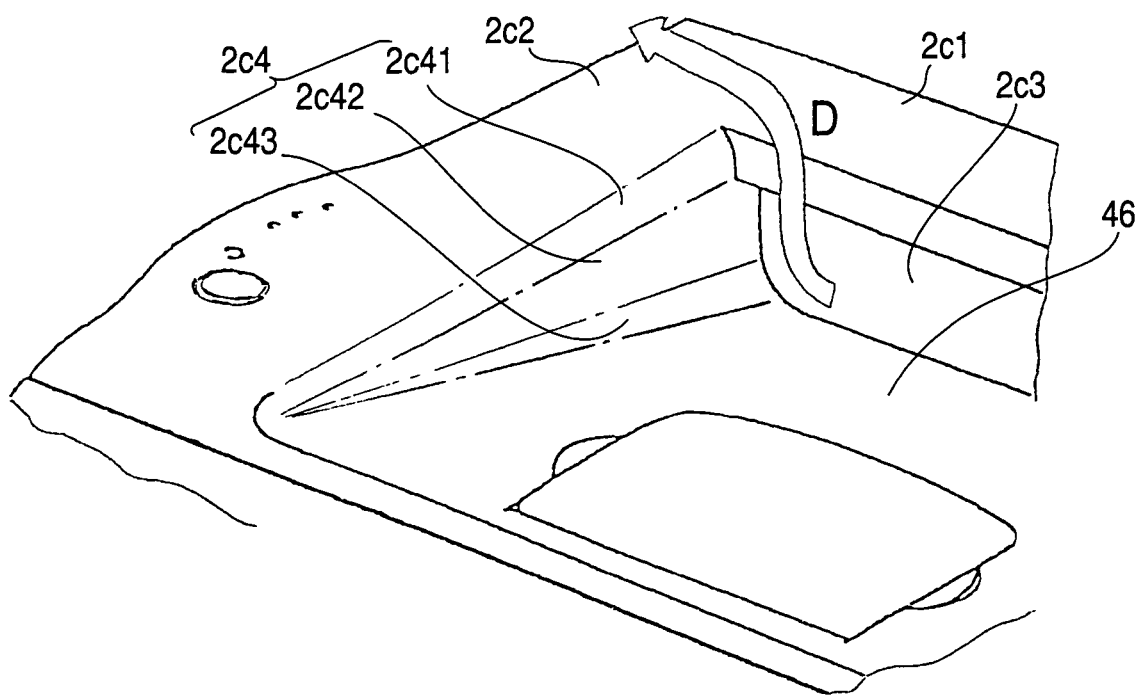
FIG. 8 is a partial enlarged view of the first embodiment.

As shown in FIG. 8, the sidewall 2*c*4 has an upper curve face 2*c*41, a vertical face 2*c*42 and a lower curve face 2*c*43. The upper curve face 2*c*41 and the lower curve face 2*c*43 are curved in different directions. The upper curve face 2*c*41 is an upward convex curved surface and the lower curve face 2*c*43 is a downward convex curved surface. The discharge tray 46 and the side portion 2*c*2 are smoothly connected by the lower curve face 2*c*43, the vertical face 2*c*42 and the upper curve face 2*c*41.

Accordingly, the dust accumulated at the corner formed by the discharge tray 46 and the vertical wall 2*c*3 extended from the discharge tray 46 to the center portion 2*c*1 can be removed by using a brush, etc., as shown by the arrow D in FIG. 8.

Further, since the upper curve face 2*c*41 is provided, the top cover 2*c* can be more reliably injection-molded.

Figure 9:
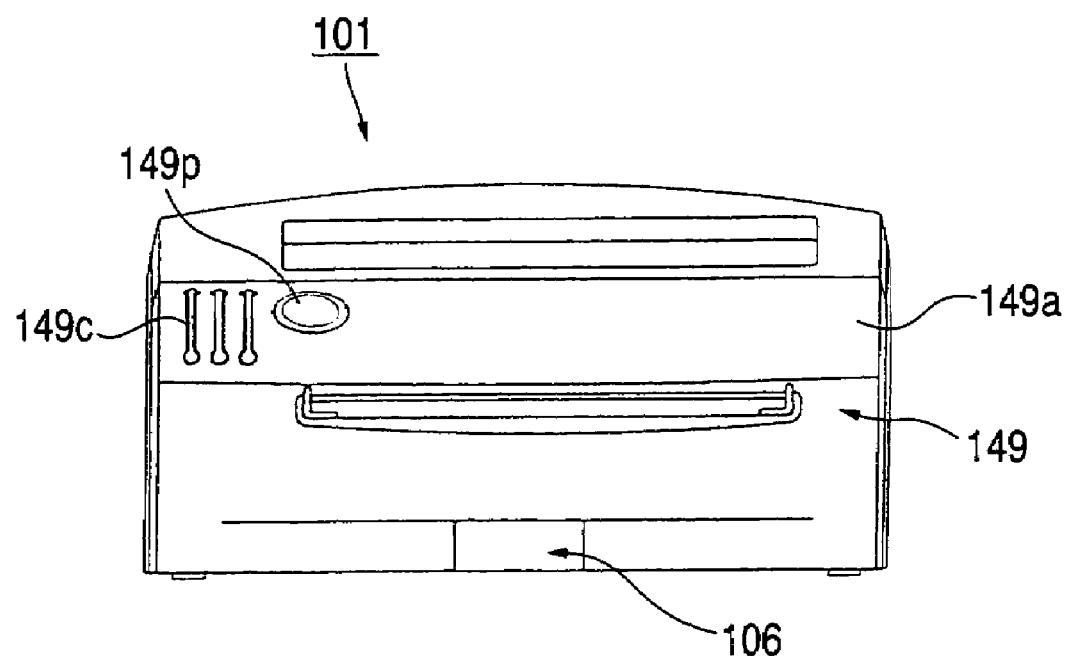
FIG. 9 is a front plan view showing a second embodiment.
Figure 10:
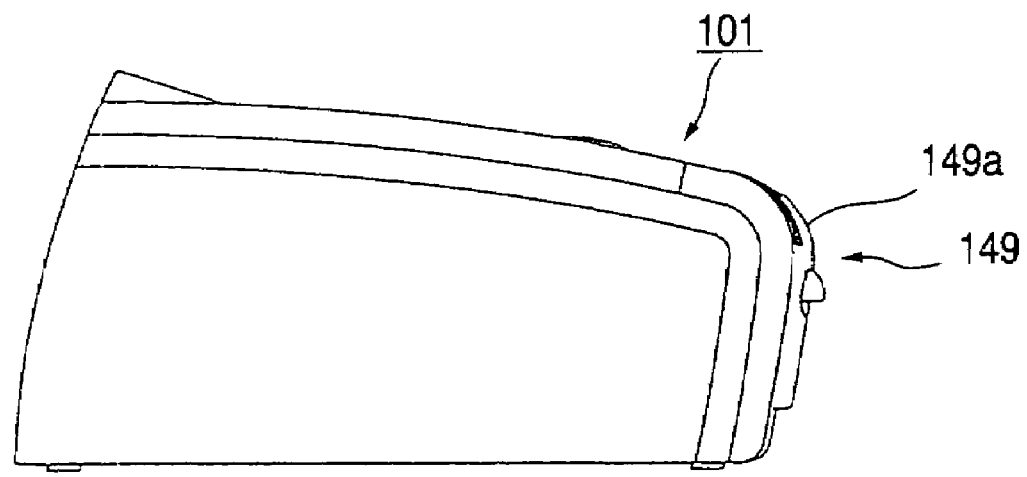
FIG. 10 is a left side view of the second embodiment.

Next, a second embodiment of the present invention will be described with reference to FIGS. 9 to 12. FIG. 9 is a front view of a printer 101. FIG. 10 is a side view of the printer 101. FIG. 11 is a top view of the printer 101. FIG. 12 is a perspective view of the printer 101.

The printer 101 has a front cover 149 having a round portion 149*a*. An indicator 149*i* and an operation button 149*p* are arranged in the round portion 149*a*.

In this embodiment, the front face of a paper cassette 106 and the front cover 149 are integrally formed. When the paper cassette 106 is pulled out to the front side, the front cover 149 is also opened to the front side and the process unit within the printer 101 is exposed.

As shown in FIG. 11, a center portion 102a1 on the front face 102 of the printer 101 is projected to the front side with respect to a side portion 102a2 in the same manner as the first embodiment.

A manual feed guide 149s3 is projected to the front side from the front face 102 of the printer 101.

Figure 13:
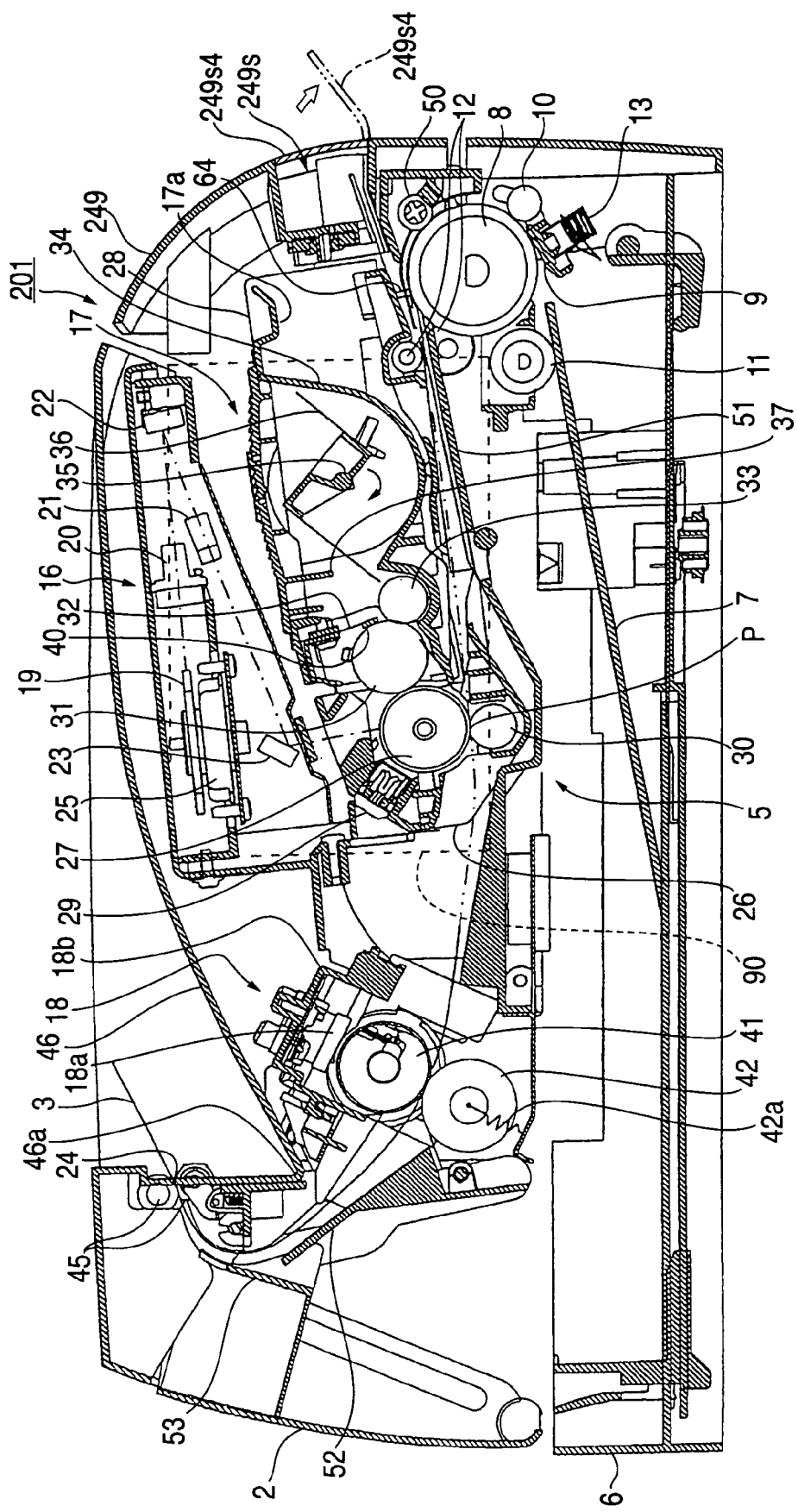
FIG. 13 is a vertical sectional view showing a third embodiment of the invention.

FIG. 13 shows a third embodiment of the present invention. In FIG. 13, members having the same structures and functions as those of members in the first embodiment are denoted by the same reference numerals as in the first embodiment, and the description thereof is omitted here.

In this embodiment, a front cover 249 has a slit cover 249s4 that opens and closes a slit opening 249s. When the slit cover 249s4 is opened as shown by the chain double-dashed line in FIG. 13 (when the slit cover 249s4 is at a first position), the slit cover 249s4 functions as a manual feed tray on which a sheet to be fed manually is placed. When the slit cover 249s4 is closed as shown by the solid line in FIG. 13 (when the slit cover 249s4 is at a second position), the slit cover 249s4 closes the slit opening 249s.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image forming apparatus, comprising:
   a case formed with a front face and a top face;
   a first accommodating portion formed in the case;
   an imaging unit that forms an image on a recording medium, the imaging unit being accommodated in the first accommodating portion detachably; and
   a front cover provided at the front face, the front cover being movable between a first position to open the first accommodating portion and a second position to close the first accommodating portion, the inaging unit being attached to and removed for the first accommadating portion when the front cover is at the first position;
   wherein the front cover is formed with a round portion and a slit opening that penetrates the front cover, and
   the front cover is divided into an upper part above the slit opening and a lower part below the slit opening, the upper part having an upper face that inclines upward, the lower part having a lower face that extends substantially horizontally, the upper face and the lower face defining the slit opening.

2. The image forming apparatus according to claim 1, further comprising:
   a second accommodating portion provided below the first accommodating portion;
   a cassette that accommodates the recording medium, the cassette being accommodated in the second accommodating portion detachably; and
   a feed path formed in the case through which the recording medium is fed from the cassette to the imaging unit.

3. The image forming apparatus according to claim 2, wherein the slit opening communicates with the feed path so as to feed a recording medium from the slit opening to the imaging unit through the feed path.

4. The image forming apparatus according to claim 3, wherein the slit opening comprises a center portion at central of the slit opening and an end portion at both ends of the slit opening, the center portion being projected forward from the end portion.

5. The image forming apparatus according to claim 3, wherein the front cover is divided into an upper part above the slit opening and a lower part below the slit opening, the lower part being projected forward from the upper part.

6. The image forming apparatus according to claim 5, wherein the round portion includes the upper part.

7. The image forming apparatus according to claim 3, wherein the front cover is pivotably provided at the front face around an axis, the axis being above the cassette.

8. The image forming apparatus according to claim 3, wherein the front cover comprises a slit cover being movable between a first position to open the slit opening and a second position to close the slit opening, the slit cover holding the recording medium to feed the recording medium from the slit opening to the imaging unit through the feed path when the slit cover is at the first position.

9. The image forming apparatus according to claim 1, wherein a center part of the front cover is projected forward from a side part of the front cover, the side part being both sides of the front cover.

10. The image forming apparatus according to claim 1, further comprising:
    an indicator provided at the round portion of the front cover.

11. The image forming apparatus according to claim 1, further comprising:
    a top cover provided at the top face including a round portion and a flat portion continuing from the round portion, the round portion of the top cover being continuous with the round portion of the front cover; and
    a discharge tray formed at the top cover, the recording medium being discharged at the discharge tray;
    wherein the discharge tray includes an inclined portion that inclines upward, the inclined portion terminates at the flat portion of the top cover.

12. The image forming apparatus according to claim 1, wherein the front cover comprises a side rib that forms a part of a side face of the image forming apparatus, the side rib extending from a top to a bottom of the front cover.

13. An image forming apparatus, comprising:
    a case formed with a front face and a top face;
    a first accommodating portion formed in the case;
    an imaging unit that forms an image on a recording medium, the imaging unit being accommodated in the first accommodating portion detachably;
    a front cover provided at the front face, the front cover being movable between a first position to open the first accommodating portion and a second position to close the first accommodating portion, the imaging unit being attached to and removed from the first accommodating portion when the cover is at the first position;
    a top cover provided at the top face, the top cover including a round portion and a flat portion continuing from the round portion, the round portion being upwardly convex; and
    a discharge tray formed at the top cover, the recording medium being discharged at the discharge tray;

wherein the discharge tray includes an inclined portion that inclines upward, the inclined portion terminates at the flat portion of the top cover.

14. An image forming apparatus, comprising:
a case formed with a front face and a top face;
a first accommodating portion formed in the case;
an imaging unit that forms an image on a recording medium, the imaging unit being accommodated in the first accommodating portion detachably;
a front cover provided at the front face, the front cover being movable between a first position to open the first accommodating portion and a second position to close the first accommodating portion, the imaging unit being attached to and removed from the first accommodating portion when the front cover is at the first position;
a second accommodating portion provided below the first accommodating portion;
a cassette that accommodates the recording medium, the cassette being accommodated in the second accommodating portion detachably; and
a feed path formed in the case through which the recording medium is fed from the cassette to the imaging unit;
wherein the front cover comprises a slit opening that penetrates the front cover, the slit opening communicating with the feed path so as to feed a recording medium from the slit opening to the imaging unit through the feed path;
the front cover is divided into an upper part above the slit opening and a lower part below the slit opening, the lower part being projected forward from the upper part;
the upper part has an upper face that inclines upward;
the lower part has a lower face that extends substantially horizontally; and
the upper face and the lower face define the slit opening.

15. An image forming apparatus, comprising:
a case formed with a front face and a top face;
a first accommodating portion formed in the case;
an imaging unit that forms an image on a recording medium, the imaging unit being accommodated in the first accommodating portion detachably;
a front cover provided at the front face, the front cover being movable between a first position to open the first accommodating portion and a second position to close the first accommodating portion, the imaging unit being attached to and removed from the first accommodating portion when the front cover is at the first position; and
a top cover provided at the top face, the top cover including a discharge tray on which the recording medium is discharged, a side part located above the discharge tray and a side wall that connects the discharge tray and the side part;
wherein the side wall comprises an upper curved face that is convexly curved.

16. The image forming apparatus according to claim 15, wherein the side wall comprises a lower curved face that is concavely curved and formed between the upper curved face and the discharge tray.

17. An image forming apparatus, comprising:
a case formed with a front face and a top face;
a first accommodating portion formed in the case;
an imaging unit that forms an image on a recording medium, the imaging unit being accommodated in the first accommodating portion detachably; and
a front cover provided at the front face, the front cover being movable between a first position to open the first accommodating portion and a second position to close the first accommodating portion, the imaging unit being attached to and removed from the first accommodating portion when the front cover is at the first position;
wherein the front cover and the case are formed with a round portion that is continuous between the front cover and the case, and
the front cover opens in the middle of the round portion.

18. The image forming apparatus according to claim 17, further comprising a discharge tray formed at the top face, onto which the recording medium is discharged from a rear side thereof.

* * * * *